US008984936B2

(12) United States Patent
Brusarosco et al.

(10) Patent No.: US 8,984,936 B2
(45) Date of Patent: Mar. 24, 2015

(54) MONITORING DEVICE FOR TYRES FOR VEHICLE WHEELS, TYRE FOR VEHICLE WHEELS PROVIDED WITH SAID MONITORING DEVICE, AND METHOD FOR INSTALLING AN ELECTRONIC UNIT IN SAID TYRE

(71) Applicant: Pirelli Tyre S.p.A., Milan (IT)

(72) Inventors: Massimo Brusarosco, Milan (IT); Federico Mancosu, Milan (IT)

(73) Assignee: Pirelli Tyre S.p.A., Milan (IT)

( * ) Notice: Subject to any disclaimer, the term of this patent is extended or adjusted under 35 U.S.C. 154(b) by 0 days.

(21) Appl. No.: 14/366,164

(22) PCT Filed: Dec. 18, 2012

(86) PCT No.: PCT/IB2012/057409
§ 371 (c)(1),
(2) Date: Jun. 17, 2014

(87) PCT Pub. No.: WO2013/098711
PCT Pub. Date: Jul. 4, 2013

(65) Prior Publication Data
US 2014/0355648 A1 Dec. 4, 2014

Related U.S. Application Data

(60) Provisional application No. 61/594,439, filed on Feb. 3, 2012.

(30) Foreign Application Priority Data

Dec. 29, 2011 (IT) .............................. MI2011A2426

(51) Int. Cl.
*G01M 17/00* (2006.01)
*G01M 17/02* (2006.01)
(Continued)

(52) U.S. Cl.
CPC .............. *G01M 17/02* (2013.01); *B60C 25/005* (2013.01); *B60C 23/20* (2013.01); *B60C 23/0491* (2013.01); *G01K 13/00* (2013.01)
USPC ............................................................ 73/146

(58) Field of Classification Search
USPC .................................................. 73/146–146.8
See application file for complete search history.

(56) References Cited

U.S. PATENT DOCUMENTS 6,030,478 A    2/2000 Koch et al.
(Continued)

FOREIGN PATENT DOCUMENTS

DE    10 2007 030 238    1/2009
(Continued)

OTHER PUBLICATIONS

International Search Report from the European Patent Office for International Application No. PCT/IB2012/057409, mailing date Mar. 8, 2013.
(Continued)

*Primary Examiner* — Andre Allen
(74) *Attorney, Agent, or Firm* — Finnegan, Henderson, Farabow, Garrett & Dunner, L.L.P.

(57) ABSTRACT

A monitoring device for tires for vehicle wheels includes: an electronic unit; a connecting member configured for constraining the electronic unit to a tire, the connecting member being of one piece construction and including: a first and a second base portion, mutually separated by a separation region, each of the base portions having a respective base surface associable with an inner surface of a tire; and a housing portion in cooperation with the base portions defining a cavity for the electronic unit. The connecting member is deformable between an insertion condition of the electronic unit into the cavity and a retaining condition of the electronic unit in the cavity. The connecting member in the insertion condition is configured for enabling insertion of the electronic unit in the cavity when the base portions are not fastened to the inner surface of the tire. The connecting member in the retaining condition is configured for preventing extraction of the electronic unit from the cavity in any direction when the base portions are fastened to the inner surface of the tire.

26 Claims, 6 Drawing Sheets

(51) Int. Cl.
*B60C 25/00* (2006.01)
*B60C 23/20* (2006.01)
*B60C 23/04* (2006.01)
*G01K 13/00* (2006.01)

(56) References Cited

U.S. PATENT DOCUMENTS

| | | | |
|---|---|---|---|
| 6,386,251 B1 * | 5/2002 | Koch et al. | 152/152.1 |
| 6,860,303 B2 | 3/2005 | Rensel et al. | |
| 7,009,506 B2 | 3/2006 | Wilson et al. | |
| 7,874,205 B2 | 1/2011 | Hironaka | |
| 7,908,918 B2 | 3/2011 | Brusarosco et al. | |
| 8,303,742 B2 * | 11/2012 | Brusarosco et al. | 156/110.1 |
| 2006/0032564 A1 | 2/2006 | Weaver | |
| 2008/0060761 A1 | 3/2008 | Weaver | |
| 2009/0101257 A1 | 4/2009 | Brusarosco et al. | |
| 2009/0266153 A1 | 10/2009 | Hironaka | |
| 2009/0320580 A1 * | 12/2009 | Mancosu et al. | 73/146 |
| 2011/0240195 A1 | 10/2011 | Ellmann | |

FOREIGN PATENT DOCUMENTS

| | | |
|---|---|---|
| DE | 10 2009 006 707 | 8/2010 |
| DE | 10 2009 025 794 | 11/2010 |
| EP | 1 627 753 | 2/2006 |
| EP | 1 948 452 | 1/2009 |
| IT | MI 2001 A 002427 | 12/2011 |
| JP | 2007-099052 | 4/2007 |
| JP | 2007-331293 | 12/2007 |
| WO | WO 2006/126215 | 11/2006 |
| WO | WO 2007/048621 | 5/2007 |
| WO | WO 2007/049093 | 5/2007 |
| WO | WO 2007/121768 | 11/2007 |
| WO | WO 2010/043264 | 4/2010 |
| WO | WO 2013/098712 | 7/2013 |
| WO | WO 2013/111073 | 8/2013 |

OTHER PUBLICATIONS

Written Opinion of the International Searching Authority from the European Patent Office for International Application No. PCT/IB2012/05709, mailing date Mar. 8, 2013.

* cited by examiner

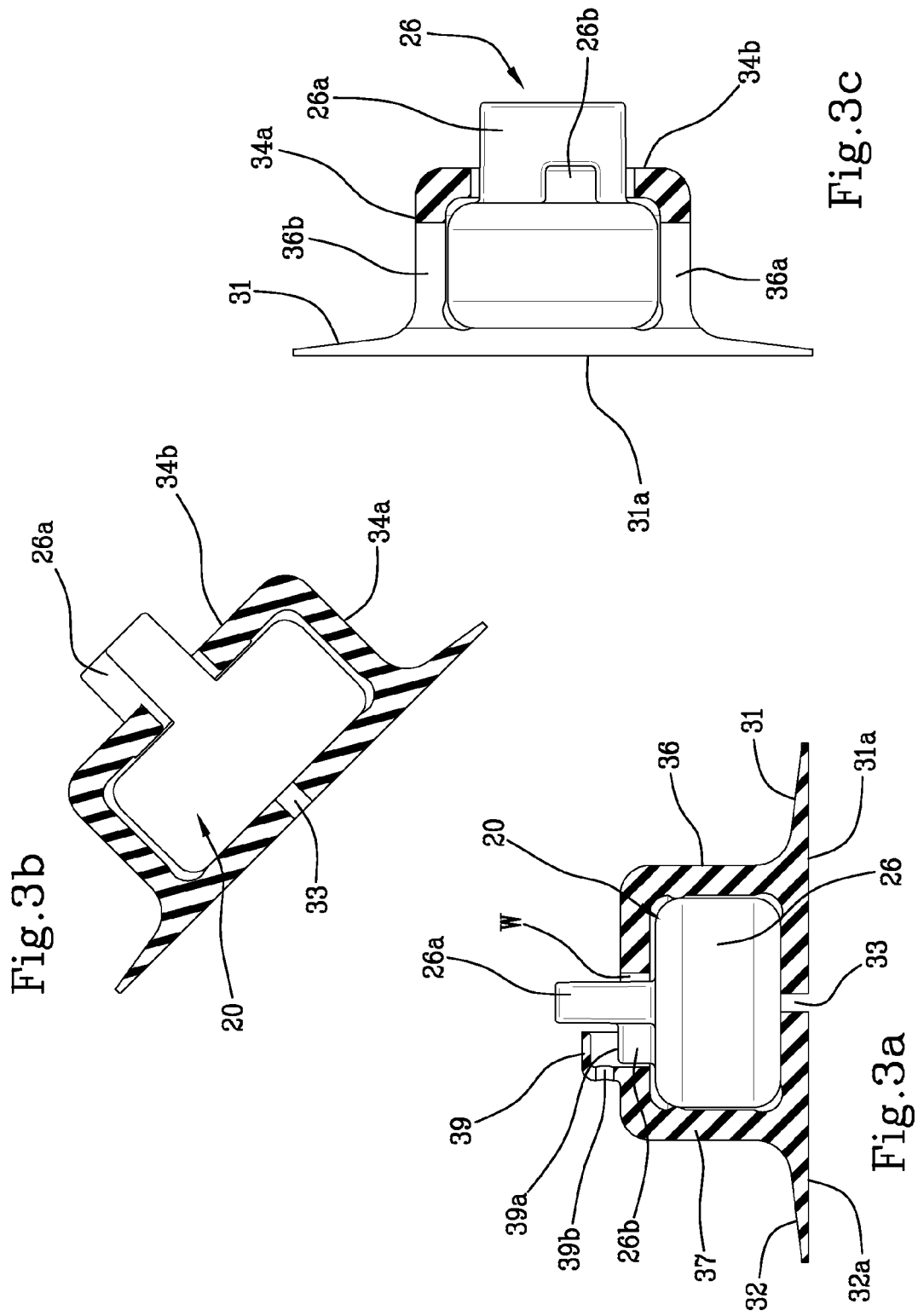

Fig.4
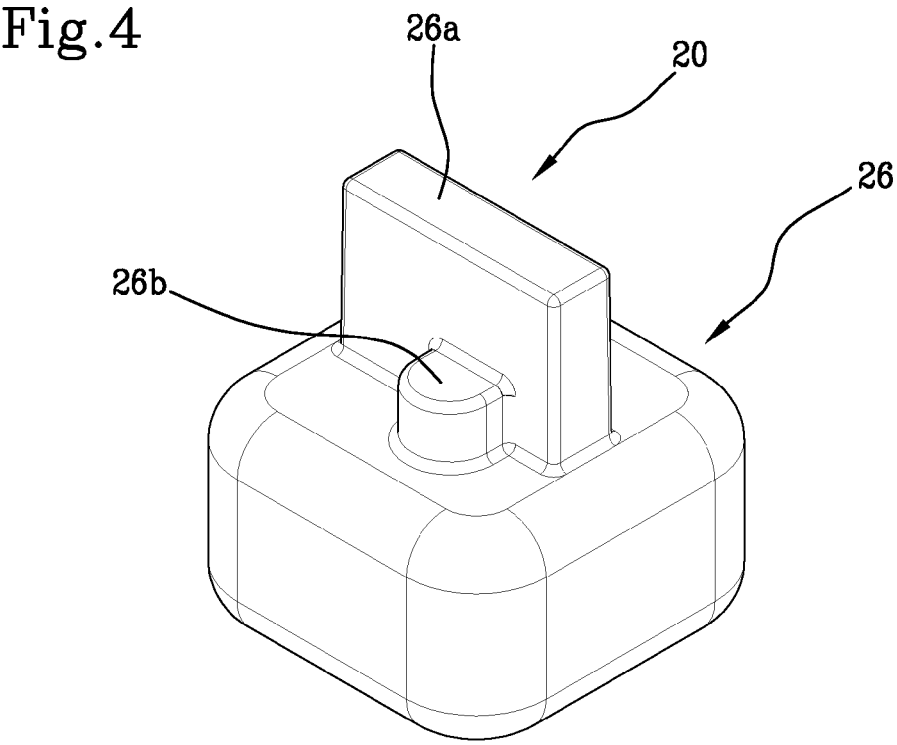
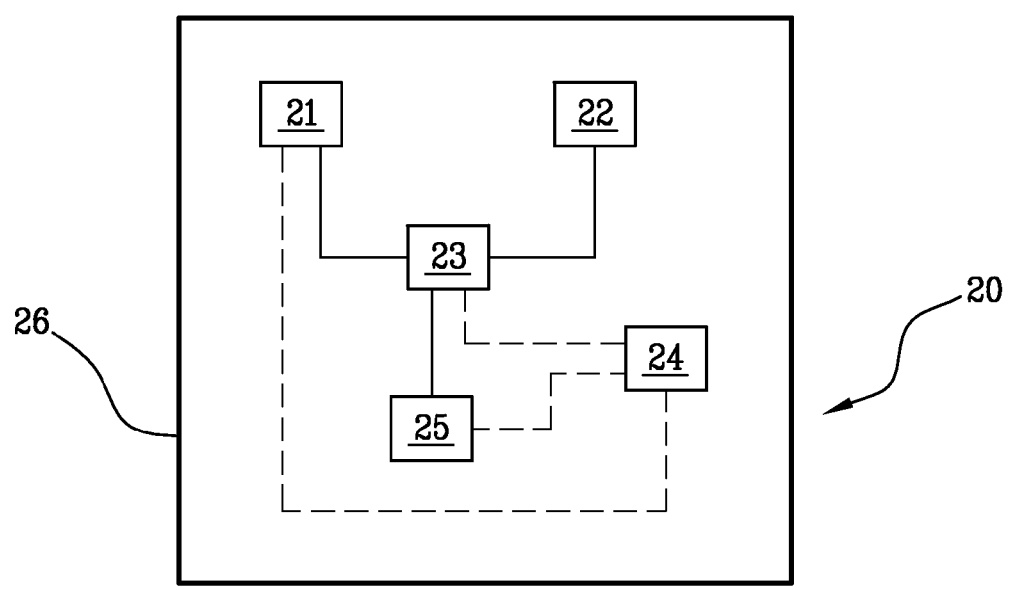
Fig.5

MONITORING DEVICE FOR TYRES FOR VEHICLE WHEELS, TYRE FOR VEHICLE WHEELS PROVIDED WITH SAID MONITORING DEVICE, AND METHOD FOR INSTALLING AN ELECTRONIC UNIT IN SAID TYRE

CROSS REFERENCE TO RELATED APPLICATIONS

This application is a national phase application based on PCT/IB2012/057409, filed Dec. 18, 2012, which claims the priority of Italian Patent Application No. MI2011A002426, filed Dec. 29, 2011, and the benefit of U.S. Provisional Application No. 61/594,439, filed Feb. 3, 2012, the content of each application being incorporated herein by reference.

BACKGROUND OF THE INVENTION

1. Field of the Invention

The present invention regards a monitoring device for tyres for vehicle wheels.

The present invention also regards a tyre for vehicle wheels provided with said monitoring device.

The present invention also regards a method for installing an electronic unit in a tyre.

2. Description of the Related Art

The need to monitor the operating conditions of the tyres and possibly track the time evolution of representative parameters of such operation has been assuming increasing importance by virtue of the requirement of increased safety imposed on vehicles by clients and/or by national directives/legislation.

The parameters generally considered can be, for example, temperature, pressure, distance travelled by the tyre (and/or number of revolutions), load acting on the tyre, as well as parameters which derive on mathematical processing that can be executed on the basis of signals detected by sensors placed inside the tyres.

Such parameters can also be used for identifying particular conditions in which the tyre and/or the vehicle are found, such as wear conditions, aquaplane conditions etc. and, more generally, for the monitoring of the forces acting on the tyre during its rolling (e.g. on the road surface).

For such purpose, inside the tyre an electronic unit can be mounted, which can comprise at least one sensor, a control unit and/or data storage unit (such as a microprocessor), a power supply system and an antenna; the latter has the task of enabling the exchange of radiofrequency signals with the devices mounted on board the vehicle.

The electronic unit can be mounted on the inner surface of the tyre by means of a connecting member.

Documents U.S. Pat. No. 6,030,478, U.S. Pat. No. 6,386,251, U.S. Pat. No. 6,860,303, U.S. Pat. No. 7,009,506, EP 1948452, U.S. Pat. No. 7,908,918 and U.S. Pat. No. 7,874,205 show several techniques by means of which an electronic unit can be associated with the inner surface of the tyre.

The Applicant has observed that the systems of known type are not entirely safe and reliable. Indeed, such systems allow, or at least do not prevent the electronic unit from being removed after having been fastened to the tyre.

According to the Applicant, this factor can be extremely disadvantageous, since the data detected and stored by means of the electronic unit are typically used also for determining the overall distance travelled by the tyre.

Such data can also be employed for the optimization of the set-up of passive control systems of the vehicle, e.g. systems adapted to verify the suitability between the type of tyre actually installed and the types of tyre provided and considered acceptable, as well as active control systems, which use, among other parameters, those identifying the type of tyre for actively operating on the operation of the vehicle, in order to maintain the latter in safety conditions (e.g. ABS, ESP, etc.).

The removal and substitution of the electronic unit can thus enable falsification of this data, allowing ill-intentioned subjects to illegally take advantage of the discrepancy between the data signalled by the electronic unit installed in substitution of that original and the actual travel data of the tyre, and/or significantly limiting the safety in the active and passive controls of the vehicle dynamics.

SUMMARY OF THE INVENTION

The Applicant has perceived that one solution to this problem can be obtained by ensuring that the electronic unit remains constrained to the tyre in a substantially irreversible manner, i.e. in a manner such that the electronic unit itself cannot be removed if not by breaking or tearing of the connecting member. In this manner, possible removal and substitution of the electronic unit would be evident and easily verifiable.

The Applicant has found that the electronic unit can be suitably constrained to the inner surface of the tyre by means of a connecting member that substantially entirely encloses the electronic unit itself and which prevents extraction thereof in any direction.

According to a first aspect, the invention regards a monitoring device for tyres for vehicle wheels, comprising:
an electronic unit;
a connecting member adapted to constrain said electronic unit to a tyre, said connecting member being of one piece construction and comprising:
a first and a second base portion, mutually separated by a separation region, each of said base portions having a respective base surface associable with an inner surface of a tyre;
a housing portion associated with said base portions, and in cooperation with said base portions defining a cavity for housing said electronic unit,
wherein said connecting member is deformable between an insertion condition of said electronic unit into said cavity and a retaining condition of said electronic unit in said cavity,
wherein in said insertion condition said connecting member is configured for enabling insertion of said electronic unit into said cavity when said base portions are not fastened to said inner surface of said tyre,
wherein said connecting member in said retaining condition is configured for preventing extraction of said electronic unit from said cavity in any direction when said base portions are fastened to said inner surface of said tyre.

According to another aspect, the invention regards a tyre for vehicle wheels, comprising an inner surface having a substantially toroidal conformation and said monitoring device mounted on said inner surface.

According to a first aspect, the invention regards a method for installing an electronic unit in a tyre, comprising:
providing an electronic unit;
providing a connecting member of one piece construction and including:
a first and a second base portion, mutually separated by a separation region, each of said base portions having a respective base surface associable with an inner surface of a tyre;

a housing portion associated with said base portions, and in cooperation with said base portions defining a cavity for housing said electronic unit, wherein said connecting member is deformable between an insertion condition of said electronic unit into said cavity and a retaining condition of said electronic unit in said cavity, wherein in said insertion condition said connecting member is configured for enabling insertion of said electronic unit into said cavity when said base portions are not fastened to said inner surface of said tyre, wherein said connecting member in said retaining condition is configured for preventing extraction of said electronic unit from said cavity in any direction when said base portions are fastened to said inner surface of said tyre;

configuring said connecting member in said insertion condition;

inserting said electronic unit into said cavity;

configuring said connecting member in said retaining condition;

fastening said base surfaces to said inner surface of said tyre when said connecting member is in said retaining condition.

The Applicant deems that, by means of the invention presented in the abovementioned aspects, it is possible to constrain an electronic unit to the inner surface of a tyre, preventing the same from being subsequently extracted or removed from its housing without objective evidence of the substitution of the electronic components.

In accordance with one or more of the abovementioned aspects, the invention can comprise one or more of the preferred characteristics indicated hereinbelow. Preferably, said housing portion comprises:

a side structure, configured for preventing extraction of said electronic unit from said cavity in directions substantially parallel to the base surfaces of said base portions;

a top wall, adapted to prevent extraction of said electronic unit from said cavity in a direction orthogonal to the base surfaces of said base portions.

In this manner, the electronic unit is retained in a substantially irreversible manner inside the cavity, once the monitoring device is fastened to the inner surface of a tyre.

Preferably, the side structure is interposed between said base portions and said top wall.

Preferably the side structure comprises a first and a second side wall, each of said side walls substantially C-shaped and extending from a respective one of said base portions according to directions substantially orthogonal to the plane defined by said base surfaces.

Preferably the first side wall has a pair of terminal portions each facing to a respective end portion of said second side wall.

Preferably each of the regions interposed between the end portions of the first side wall and the end portions of the second side wall defines a respective through window.

In this manner, the deformation of the connecting member is facilitated between the retaining condition and the insertion condition.

Preferably each of said through windows extends from said separation region between said first and second base portions towards said top wall.

Preferably the distance between said base portions (or width of said separation region) has a given value estimated on a plane defined by said base surfaces along a direction substantially perpendicular to said major extension direction.

Preferably each of said through windows has a width, estimated in a direction parallel to said distance between said base portions, that is larger than such distance.

In this manner it is possible to easily insert the electronic unit in the cavity, while maintaining optimal conditions in the mutual constraint between the inner surface of the tyre and the base surfaces of the connecting member.

By means of said through windows, also the moulding of the connecting member is facilitated, since such windows allow the extraction, at the end of the process, of the so-called "male", i.e. the mould portion adapted to internally shape the cavity.

Preferably the concavities of said lateral walls are mutually faced to define said cavity.

Preferably the inner surface of said housing portion delimiting said cavity does not show cylindrical symmetry relative to any axis.

Preferably the electronic unit does not reveal a cylindrical symmetry relative to any axis.

Thus, this allows preventing the electronic unit, following stresses sustained during the rolling of the tyre, from rolling inside the cavity, causing—by friction and/or rubbing and/or other mechanical stresses—a rapid wear of the structure of the connecting member, which could deteriorate up to breakage at some point, causing a condition in which the connecting member itself is no longer able to maintain the electronic unit inside the cavity.

Preferably the base portions, when said connecting member is in the retaining condition, define a substantially circular profile on the plane defined by said base surfaces.

Preferably a diameter of said substantially circular profile lies in said major extension direction of the separation region.

Preferably the retaining condition of said connecting member is a condition of elastic rest of the connecting member itself. In other words the connecting member, when it is not substantially subjected to external mechanical stresses which cause a deformation thereof (condition of elastic rest), is preferably found in the abovementioned retaining condition. In this manner, the fastening of the monitoring device to the inner surface of the tyre is facilitated, since it is not necessary to apply any force to the connecting member so that the latter maintains the retaining condition, i.e. the condition in which it must be fastened to the inner surface of the tyre.

Preferably the electronic unit comprises at least one sensor, one power supply system and one antenna.

Preferably the top wall of said connecting member has at least one through window through which said antenna can emit/receive electromagnetic signals.

Thus, this allows preventing the material composing the connecting member, and in particular the carbon black and/or other reinforcing charges present in such structure, from interfering, jeopardising a correct operation of the electronic unit in the step of communication with the devices on board the vehicle.

Preferably said sensor is a pressure and/or temperature sensor.

Also the number of revolutions and/or average angular speed of the tyre and/or load acting on the tyre are determined preferably by means of said sensor.

Preferably the top wall of said connecting member has a through window through which said pressure and/or temperature sensor can carry out pressure and/or temperature measurements.

In this manner, the sensor is enabled to have substantially direct access to the environment enclosed by the inner surface of the tyre, so as to correctly and reliably execute the expected detections.

Preferably said device also comprises a covering element positioned on said top wall and facing said through window at said pressure and/or temperature sensor.

In this manner, though enabling the sensor to correctly operate in contact with the environment inside the tyre, dust or other similar elements present inside the tyre are prevented from settling at the through window, interfering with the detections executed by the sensor.

Preferably the major extension direction of the separation region between the first and the second base portion substantially lies in a radial plane of said tyre, i.e. a plane that contains the rotation axis of the tyre itself.

In this manner, the stresses sustained by the tyre, in particular at the entrance and exit of the so-called mould region, are absorbed in an optimal manner by the connecting member.

Preferably said inner surface is a liner of said tyre.

Preferably, configuring said connecting member in the insertion condition comprises moving said base portions away from each other.

Preferably, inserting said electronic unit into said cavity comprises moving said electronic unit close to said housing portion through said base portions moved away from each other.

Preferably, said connecting member is configured in the retaining condition after insertion of said electronic unit in said cavity.

Preferably, configuring said connecting member in said retaining condition comprises enabling elastic moving close to each other again of said moved apart base portions.

BRIEF DESCRIPTION OF THE DRAWINGS

Further characteristics and advantages will be clearer from the description of a preferred, non-exclusive embodiment of the invention.

Such description is provided hereinbelow with reference to the attached figures, also being provided purely by way of non-limiting example, wherein:

FIG. 3a schematically shows a section view of the device of FIG. 2 along the line IIIa-IIIa shown in FIG. 3, with the electronic unit in side view;

FIG. 3b schematically shows a section view of the device of FIG. 2 along the line IIIb-IIIb shown in FIG. 3;

FIG. 3c schematically shows a section view of the device of FIG. 2 along the line IIIc-IIIc shown in FIG. 3, with the electronic unit in side view;

FIG. 4 schematically shows a perspective view of an electronic unit part of the device of FIG. 2;

FIG. 5 shows a block diagram of the electronic unit schematically represented in FIG. 4;

DETAILED DESCRIPTION OF THE INVENTION

With reference to the attached figures, a tyre for vehicle wheels provided with a monitoring device according to the present invention was indicated in its entirety with 1. The monitoring device is indicated with the numeric reference 10.

The tyre 1, per se known, is not described herein in detail.

Figure 1:
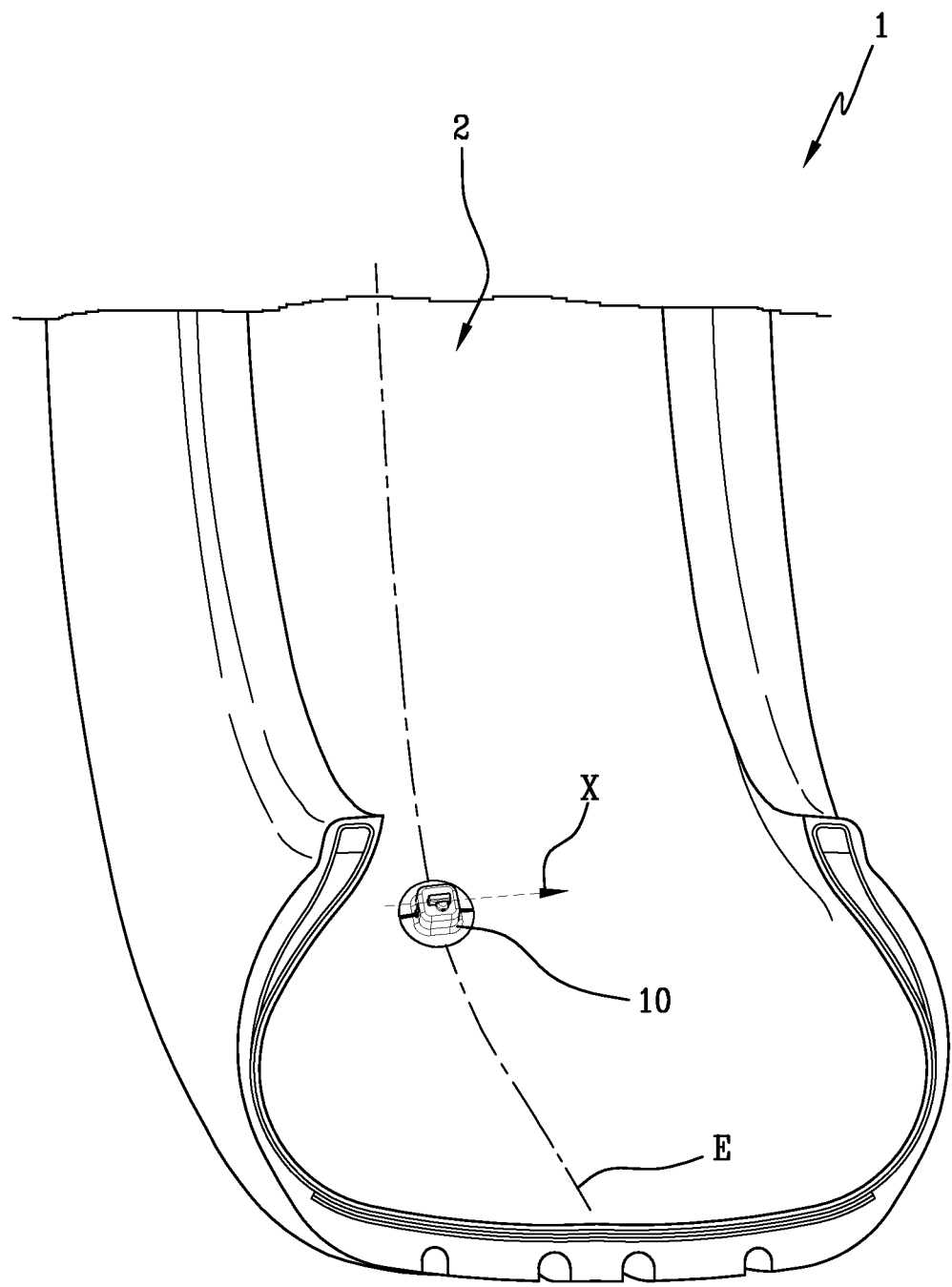
FIG. 1 shows a tyre for vehicle wheels on which a monitoring device according to the invention is installed.

The tyre 1 (FIG. 1) comprises an inner surface 2, preferably comprising or constituted by the so-called "liner".

The monitoring device 10 is mounted on such inner surface 2.

The monitoring device 10 comprises an electronic unit 20 (FIGS. 4-5).

Preferably the electronic unit 20 comprises at least one sensor 21 and at least one antenna 22.

For example, said sensor 21 is a pressure and/or temperature sensor, configured in order to detect a pressure and/or a temperature inside the tyre 1.

In a further embodiment, the sensor 21 can be a sensor of accelerometer type, configured for detecting the mechanical stresses to which the tyre 1 is subjected.

In addition or as an alternative, the sensor 21 can be a sensor of inertia type.

In one embodiment, the sensor 21 can be constituted at least in part by a self-supplying system ("energy scavenger") of the electronic unit, which allows obtaining both the electrical power supply for the electronic unit itself, and signals, e.g. analogue, representative of the mechanical actions transmitted by the tyre.

In general, the sensor 21 can also be employed for determining the number of revolutions of the tyre and/or of the load acting on the tyre and/or of the angular speed and/or of parameters representative of operating conditions of the tyre (e.g. friction, wear and/or aquaplane).

The antenna 22 has at least the task of transmitting the data detected by the sensor 21 to the apparatuses on board the vehicle on which the tyre 1 is mounted.

Preferably the electronic unit 20 also comprises a processing circuit 23, associated with the sensor 21 and the antenna 22.

The processing circuit 23 can have the task of managing (e.g. acquiring, and/or filtering, and/or processing) the signals detected by the sensor 21, for the purpose of detecting the data to be stored and/or transmitted by means of the antenna 22.

Preferably the electronic unit 20 also comprises a power supply system 24, provided to supply electrical power to the electronic unit 20.

Preferably the power supply system 24 comprises at least one battery. In addition to or in alternative to such battery, the power supply system 24 can comprise a device capable of transforming the mechanical energy transmitted to the device itself during the rolling of the tyre into electrical energy (energy scavenger).

The antenna 22 can also receive signals from the apparatuses on board the vehicle and/or by systems placed outside the vehicle itself. For example, the electronic unit 20 can comprise two antennas, of which one is arranged for the transmission (e.g. at a frequency of 433 MHz) of the processed and/or stored data, and another arranged to receive (e.g. at a frequency of 125 kHz) signals from systems placed on board the vehicle and/or outside the vehicle itself (e.g. wake-up signals of the monitoring device, and/or signals containing data for the pre-configuration of the monitoring device, and/or signals containing instructions for the programming of the monitoring device).

The electronic unit 20 can also comprise a memory 25, in which data relative to the operation of the tyre and/or configuration/setup data typically referred to the characteristics of the tyre itself, and/or identification data of the monitoring device 10 and/or of the tyre 1 is stored. By way of example, in the memory 25, there can be stored data representative of the distance travelled by the tyre, preferably determined as a function of the overall number of revolutions carried out by the tyre itself. In the memory 25 there can also be stored one or more processing procedures of the signal detected by the at least one sensor 21, and/or calculation algorithms of predetermined parameters starting from the signals detected by the at least one sensor 21 (or on pre-processed signals), and/or signal filtering logic. Preferably the electronic unit 20 comprises a containment body 26, preferably rigid, in which the different elements (sensor, antenna, power supply system etc.) are housed.

The containment body 26 can be obtained according to techniques that are very well known, for example embedding the circuitry of the electronic unit 20 in a resin casting which stiffens following the solidification thereof, or by means of moulding. Preferably, the electronic unit 20, and in particular the containment body 26, does not reveal a cylindrical symmetry along any axis.

Preferably the containment body 26 has at least one first expansion 26a inside of which the antenna 22 is at least partially extended (or at least one of the antennas).

Preferably the containment body 26 has a second expansion 26b inside of which the sensor 21 is at least partially extended. In the case of pressure and/or temperature sensor, the second expansion 26b has an opening (not shown in FIG. 4), for the purpose of allowing the sensor to carry out the necessary measurements.

The monitoring device 10 also comprises a connecting member 30.

The connecting member 30 maintains the electronic unit 20 constrained to the tyre 1, and in particular to the inner surface 2 of the latter.

The connecting member 30 is of one piece construction.

Preferably the connecting member 30 is made of elastomeric material. Such elastomeric material can for example comprise a thermoplastic elastomer. In a preferred embodiment, the elastomeric material comprises a halogenated butyl rubber and a synthetic rubber (e.g. polybutadiene, or polyisoprene).

Examples of elastomeric materials which can be employed are described in the international patent application published with number WO 2010/043264 on behalf of the same Applicant.

The connecting member 30 (FIGS. 2, 2a, 3, 3a-3c, 6) comprises a first and a second base portion 31, 32. The base portions 31, 32 are separated by a separation region 33. The separation region 33 has a major extension direction X. Each of the base portions 31, 32 has a respective base surface 31a, 32a. The base surfaces 31a, 32a are associable to the inner surface 2 of the tyre 1.

The connecting member 30 also comprises a housing portion 34 associated with the base portions 31, 32. The housing portion 34 in cooperation with the base portions 31, 32 defines a cavity 35 (FIG. 6) for housing the electronic unit 20.

Figure 2:
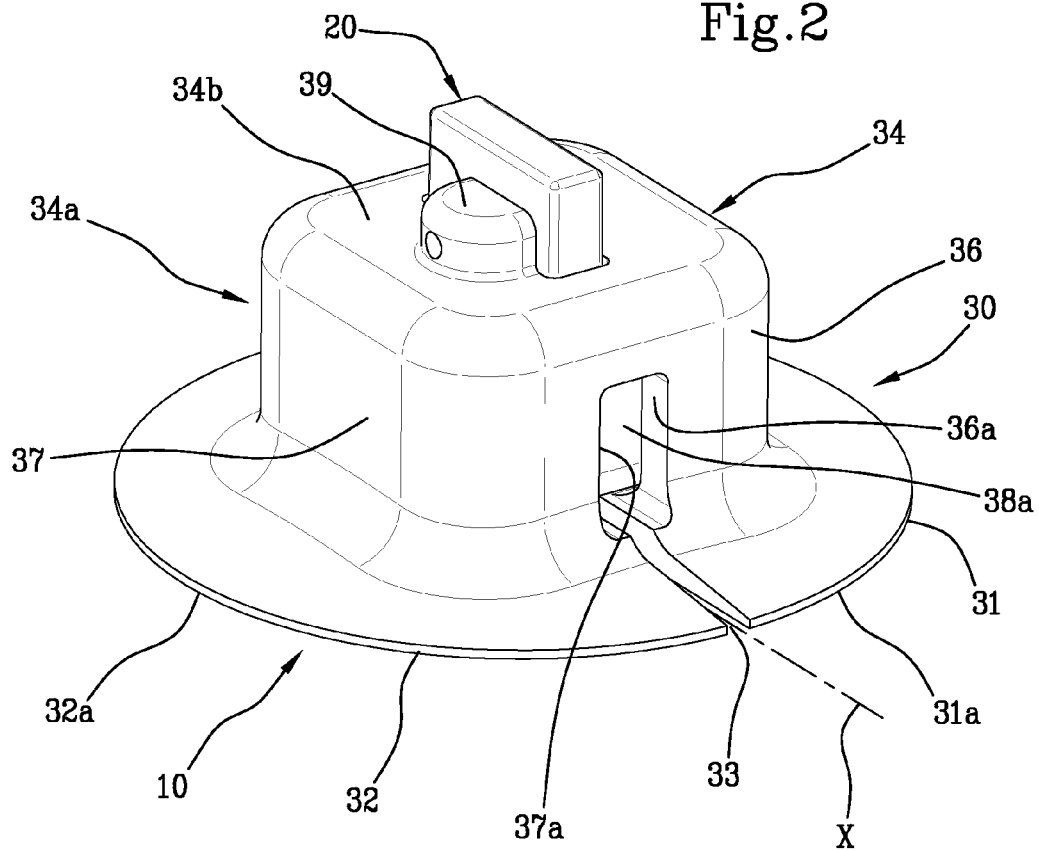
FIG. 2 schematically shows a perspective view of the monitoring device according to the invention.
Figure 6:
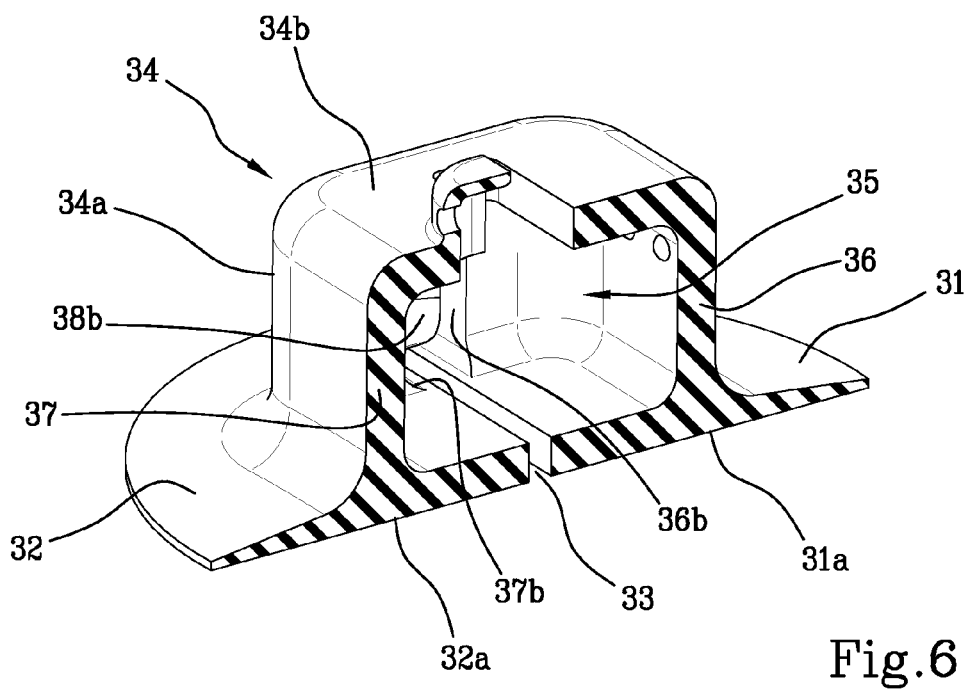
FIG. 6 schematically shows a perspective view in section of the device of FIG. 2 in which some parts have been eliminated in order to better illustrate others.

The connecting member 30 is deformable between an insertion condition of the electronic unit 20 in the cavity 35 (FIG. 2a), and a retaining condition of the electronic unit 20 in the cavity 35 (FIG. 2).

In other words, by virtue of its elastic deformability, the connecting member 30 is capable of enabling insertion of the electronic unit 20 in the cavity 35.

Following such insertion, the electronic unit 20 is contained and retained in the cavity 35.

In particular, the connecting member 30, when found in the insertion condition, is configured for enabling insertion of the electronic unit 20 in the cavity 35 when the base portions 31, 32 are not fastened to the inner surface 2 of the tyre 1.

When instead the connecting member 30 is found in the retaining condition and the base portions 31, 32 are fastened to the inner surface of the tyre 2, then the connecting member 30 is capable of preventing the electronic unit 20 from being extracted from the cavity 35 under any direction.

It is observed that the abovementioned conditions of insertion and retention of the connecting member 30 have been identified and described separately for the sole purpose of suitably outlining several characteristics of the invention. Clearly, during its own operation, in running conditions of the tyre 1, the connecting member 30 can be found in several operative conditions/situations, dictated by the conformation assumed by the inner surface 2 of the tyre 1 and by the stresses that will be transferred to the connecting member 30 itself.

More in detail, the housing portion 34 comprises a side structure 34a and a top wall 34b.

The side structure 34a is configured for preventing extraction of the electronic unit 20 from the cavity 35 in directions substantially parallel to the plane defined by the base surfaces 31a, 32a of the base portions 31, 32.

The top wall 34b is adapted to prevent extraction of the electronic unit 20 from the cavity 35 in a direction orthogonal to the plane defined by the base surfaces 31a, 32a of the base portions 31, 32.

In a preferred embodiment, when the connecting member 30 is configured in the retaining condition, the side structure 34a and the top wall 34b are capable of retaining the electronic unit 20 in the cavity 35, i.e. they prevent the exit of the electronic unit 20 from the cavity 35, independent of whether the monitoring device 10 is fastened to the inner surface 2 of the tyre 1.

In other words, the side structure 34a and the top wall 34b respectively prevent extraction of the electronic unit 20:
  in directions substantially parallel to the plane defined by the base surfaces 31a, 32a
  in a direction orthogonal to the plane defined by said base surfaces 31a, 32a, in moving away from the base portions 31, 32 and on the opposite side with respect to the abovementioned base surfaces 31a, 32a
even when the monitoring device 10, and in particular the base portions 31, 32, are not fastened to the inner surface 2 of the tyre 1.

In practice, when the connecting member 30 is in the retaining condition, and the monitoring device 10 has not yet been mounted inside the tyre 1, the electronic unit 20 can be removed from the cavity 35 only by bringing the connecting member 30 in the insertion condition and extracting the electronic unit 20 itself by moving it away from the top wall 34b, passing through base portions 31, 32 opened in a suitable manner.

Preferably the side structure 34a is interposed between the base portions 31, 32 and the top wall 34b.

Figure 3:
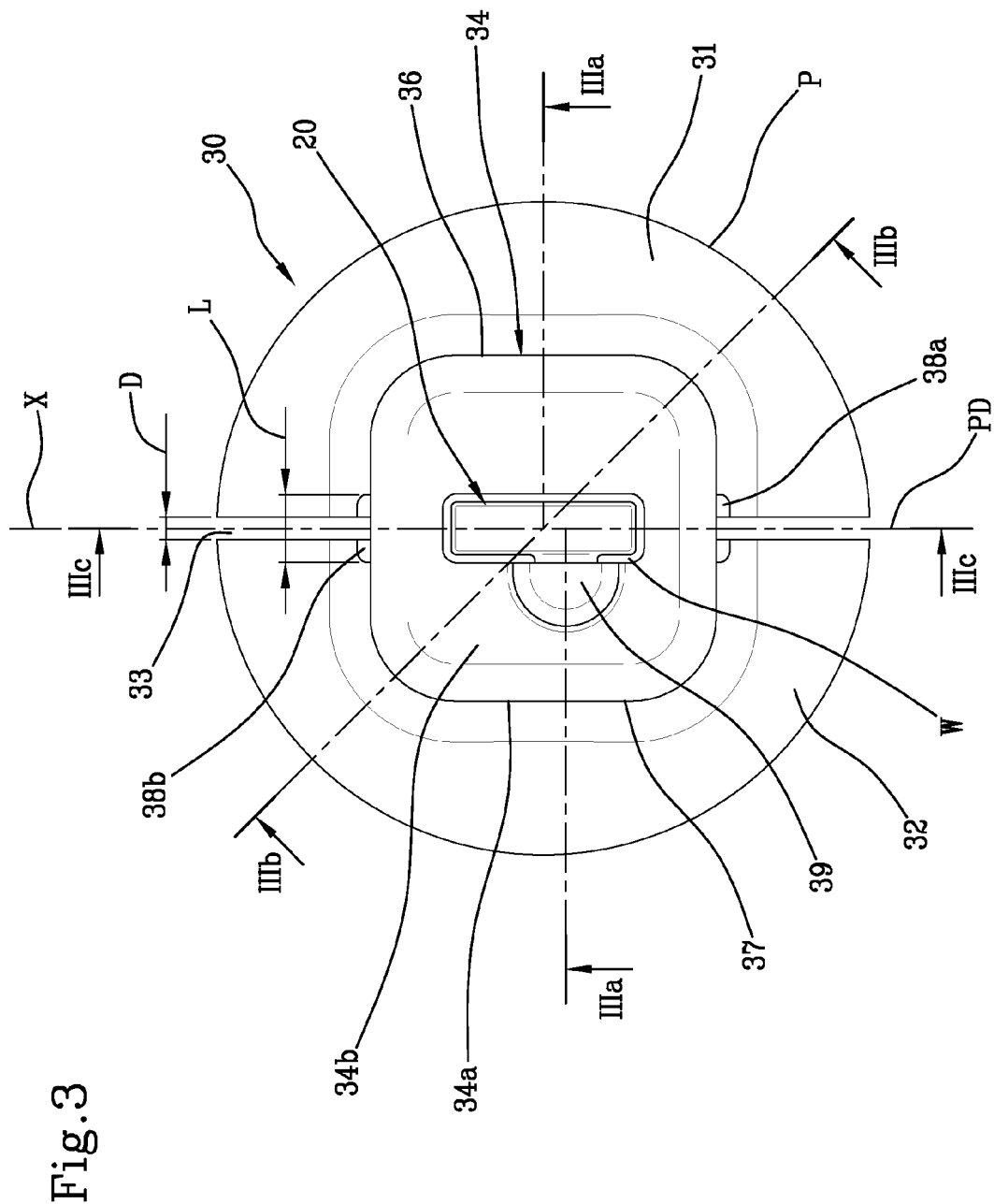
FIG. 3 schematically shows a plan view of the device of FIG. 2.

Preferably, as schematically shown in FIGS. 2 and 3, the side structure 34a comprises a first and a second side wall 36, 37.

Preferably each of the first and second side wall 36, 37 is substantially C-shaped.

In one embodiment, the side walls 36, 37 can have an outer profile (i.e. on the opposite side with respect to the cavity 35) that is substantially curved.

In a different embodiment, the side walls 36, 37 can have an outer profile slightly more square, to generally define a substantially quadrangular shape in plan view, with rounded edges and vertices.

Preferably each side wall 36, 37 extends from a respective base portion of the base portions 31, 32 of the connecting member 30 according to directions substantially orthogonal to the plane defined by the base surfaces 31a, 32a.

As an example, when the base surfaces 31a, 32a are situated on a substantially horizontal plane in a given reference system, the side walls 36, 37 are preferably vertically extended from the respective base portions 31, 32.

FIG. 2 shows that the first side wall 36 extends from the first base portion 31, and the second side wall 37 extends from the second base portion 32.

Preferably the concavities of the first and second side wall 36, 37 are mutually faced to define the abovementioned cavity 35.

Preferably the first side wall 36 has a pair of terminal portions 36a, 36b substantially located at the ends of the abovementioned C-shaped conformation.

Preferably the second side wall 37 has a pair of terminal portions 37a, 37b substantially located at the ends of the abovementioned C-shaped conformation.

Preferably the end portions 36a, 36b of the first side wall 36 face the end portions 37a, 37b of the second side wall.

Preferably each of the regions interposed between the end portions 36a, 36b of the first side wall 36 and the end portions 37a, 37b of the second side wall 37 defines a respective through window 38a, 38b.

Preferably, each through window 38a, 38b extends from the separation region 33 of the base portions 31, 32 towards the top wall 34b.

Preferably, between the base portions 31, 32 there is a distance D having a specific value on a plane defined by the base surfaces 31a, 32a along a direction substantially perpendicular to the major extension direction X of the separation region 33.

In practice, the specific value of the distance D represents a width of the separation region 33.

Preferably, each of the through windows 38a, 38b has a width L, estimated in a direction parallel to the abovementioned distance D between said base portions 31, 32, that is larger than such distance D.

Preferably the inner surface of the housing portion 34 delimiting the cavity 35 does not show cylindrical symmetry relative to any axis.

As said, also the electronic unit 20 has an analogous characteristic. In this manner, the outer walls of the electronic unit 20, and in particular the outer surface of the containment body 26, can interfere mechanically with the inner surface of the cavity 35 in a manner so as to substantially prevent the electronic unit 20 from rotating inside the cavity, wearing the structure of the connecting member 30 by friction and/or rubbing. This structure also allows preventing damage and breakage of the connecting member 30, caused by a driving action exerted by the electronic unit 20 against a portion of the structure of the connecting member 30 itself, to which the outer surface of the electronic unit 20 could adhere with particular intensity. Thus, the forces developed by means of such driving are prevented from causing tearing and breakage in the structure of the connecting member 30.

Preferably, when the connecting member 30 is in the retaining condition, the base portions 31, 32 in mutual cooperation define a substantially circular profile P, on the plane defined by the base surfaces 31a, 32a.

Preferably, a diameter PD of such substantially circular profile P lies in the abovementioned major extension direction X of the separation region 33.

In other words, the separation region 33 is extended along a diameter PD of the substantially circular profile P.

Preferably, the top wall 34b has at least one through window W through which the antenna 22 can emit/receive electromagnetic signals. This allows preventing the material composing the connecting member from interfering and jeopardising the communication between the electronic unit 20 and the on board apparatuses.

Preferably, when the electronic unit 20 is housed in the cavity 35, the first expansion 26a is advantageously at least partially inserted through the through window W. The dimensions of the through window W are such that the top wall 34b does not interfere with the first expansion 26a. This allows preventing friction and/or rubbing and/or high mechanical stresses between the top wall 34b and the first expansion 26a, which could lead to tearing the connecting member 30 at the top wall 34b. Preferably the top wall 34b of the connecting member 30 has a through window, which can advantageously coincide with the abovementioned through window W, through which the sensor 21 can carry out detections.

As stated, the containment body 26 preferably has a second expansion 26b, inside of which the sensor 21 is at least partially extended.

It is observed that, in a non-illustrated embodiment, the containment body 26 can have a single expansion, inside of which both the antenna 22 and the sensor 21 can be at least partially extended.

In a different non-illustrated embodiment, the second expansion, inside of which the sensor 21 is at least partially extended, extends through a window obtained in the side structure 34a. As an example, the second expansion can be extended through one of the abovementioned through windows 38a, 38b.

Preferably, when the electronic unit 20 is housed in the cavity 35, the second expansion 26b is advantageously inserted at least partially in, or facing, the through window.

In this manner the sensor 21 is allowed to execute the detections provided for, without the structure of the connecting member 30, and in particular the top wall 34b, acting as obstacle.

Preferably, the device 10 comprises a covering element 39 (FIGS. 2, 3, 3a) positioned on the top wall 34b and facing the through window at the sensor 21.

Preferably the covering element 39 has a substantially box-like conformation, having a first opening 39a facing the through window and a second opening 39b for a communication with the interior of the tyre 1, when the device 10 is fastened to the inner surface 2.

Preferably the first and the second opening 39a, 39b are not mutually faced.

In a preferred embodiment, the retaining condition of the connecting member 30 is a condition of elastic rest.

In other words, when not substantially subjected to external mechanical stresses that cause a deformation thereof (condition of elastic rest), the connecting member 30 is preferably found in the retaining condition.

Preferably, in the same embodiment, the insertion condition is a condition of elastic stress of the connecting member 30.

In practice, in the absence of external stresses, when not fastened to the inner surface 2 of the tyre 1, the connecting member 30 is found in the retaining condition.

In order to bring the connecting member 30 into the insertion condition, the connecting member 30 is elastically deformed (the details will be clearer hereinbelow).

Upon completing the insertion, the mechanical stresses that brought the connecting member 30 into the insertion condition are completed or terminated, such that the connecting member 30 can elastically return into the rest condition, i.e. the retaining condition.

When the connecting member 30 is found in the retaining condition, after the electronic unit 20 has been inserted into the cavity 35, the monitoring device 10 can be advantageously fixed to the inner surface 2 of the tyre 1.

Preferably, the base surfaces 31a, 32a are fastened to the inner surface 2, for example by means of bonding.

Preferably, the monitoring device 10 is fixed to the inner surface 2 in such a manner that the major extension direction X of the separation region 33 lies in a radial plane, i.e. a plane that contains the rotation axis of the tyre 1.

As stated, the present invention also aims at providing a method for installing an electronic unit in a tyre.

Such method first of all comprises providing the electronic unit 20 and the connecting member 30.

Figure 2A:
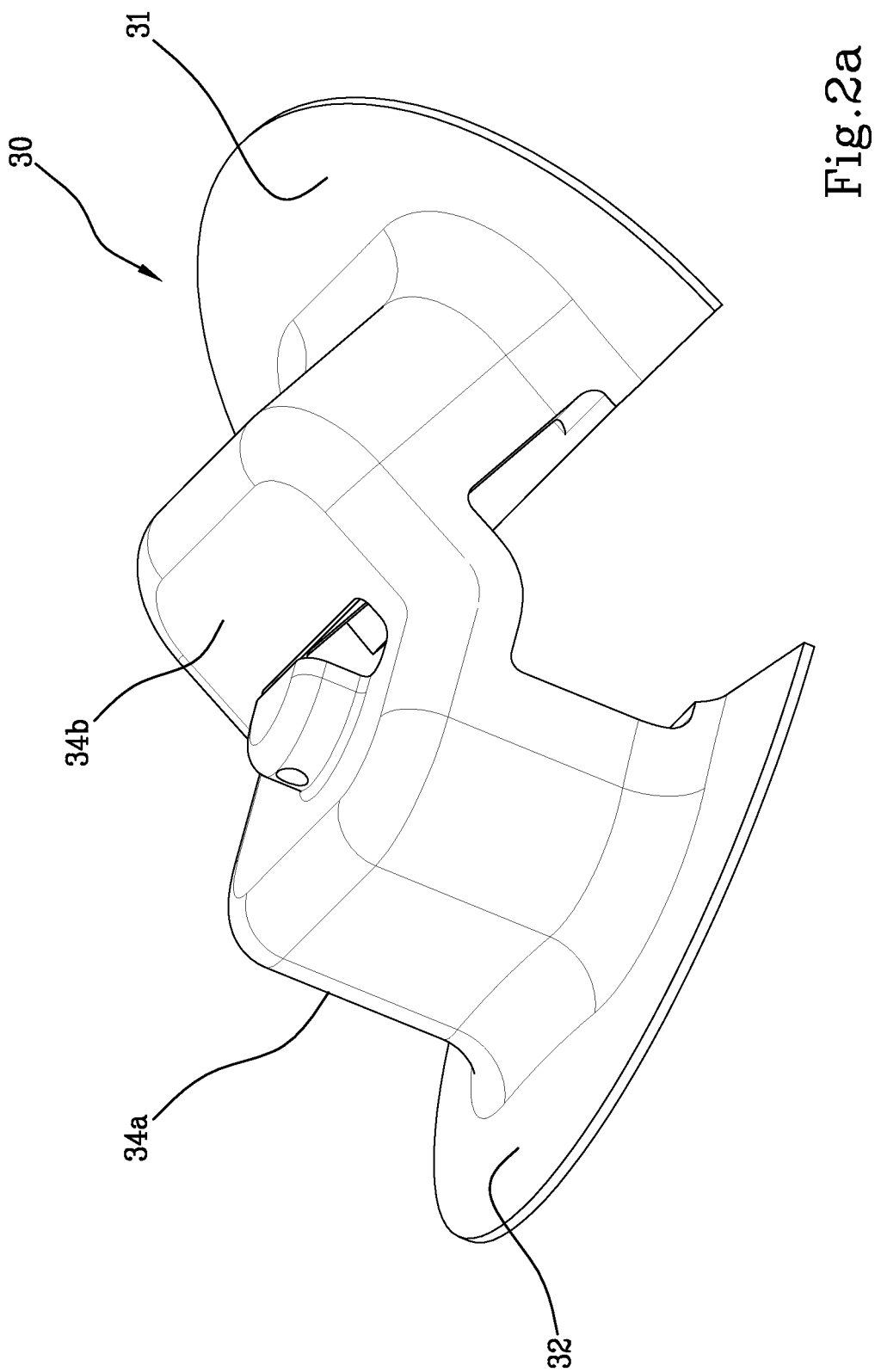
FIG. 2a schematically shows a perspective view of the monitoring device of FIG. 2 in a different operative condition, in which some parts have been eliminated in order to better illustrate others.

The connecting member 30 is configured in the insertion condition (FIG. 2a).

Preferably, this comprises moving the base portions 31, 32 away from each other, in direction substantially perpendicular to the major extension direction X.

Subsequently the electronic unit 20 can be inserted into the cavity 35.

Preferably such insertion comprises moving the electronic unit 20 closer to the housing portion 34 by passing through the base portions 31, 32 moved away from each other.

After the electronic unit 20 has been inserted in the cavity 35, the connecting member 30 is configured in the retaining condition shown in FIG. 2.

As stated, in a preferred embodiment, the retaining condition of the connecting member is a condition of elastic rest. Therefore, configuring the connecting member 30 itself in the retaining condition, after insertion of the electronic unit 20, preferably comprises enabling elastic moving close to each other again of the base portions 31, 32 previously moved apart.

Once the connecting member 30 is configured in the retaining condition and the electronic unit 20 is housed in the cavity 35, the base surfaces 31a, 32a are fastened to the inner surface 2 of the tyre 1.

Preferably, before proceeding with the fastening of the base surfaces 31a, 32a to the inner surface 2 of the tyre 1, the latter is subjected to a cleaning action, for example by means of laser, aimed at removing the powder or other possible elements that could jeopardise the quality of the installation.

Preferably, as stated, the operation of fastening the monitoring device 10 to the tyre 1 can be carried out by means of bonding.

The invention claimed is:

1. A monitoring device for a tyre for vehicle wheels comprising:
    an electronic unit;
    a connecting member configured for constraining said electronic unit to a tyre, said connecting member being of one piece construction and comprising:
        a first and a second base portion mutually separated by a separation region, each of said base portions having a respective base surface associable with an inner surface of a tyre; and
        a housing portion associated with said base portions and, in cooperation with said base portions, defining a cavity for housing said electronic unit, said housing portion comprising:
    a side structure configured for preventing extraction of said electronic unit from said cavity in directions substantially parallel to base surfaces of said base portions; and
    a tap wall adapted to prevent extraction of said electronic unit from said cavity in a direction orthogonal to the base surfaces of said base portions,
    wherein said connecting member is deformable between an insertion condition of said electronic unit in said cavity and a retaining condition of said electronic unit in said cavity,
    wherein, in said insertion condition, said connecting member is configured for enabling insertion of said electronic unit into said cavity when said base portions are not fastened to said inner surface of said tyre, and
    wherein said connecting member in said retaining condition is configured for preventing extraction of said electronic unit from said cavity in any direction when said base portions are fastened to said inner surface of said tyre.

2. The device as claimed in claim 1, wherein said side structure is interposed between said base portions and top wall.

3. The device as claimed in claim 1, wherein said side structure comprises a first and a second side wall, each of said side walls being substantially C-shaped and extending from a respective one of said base portions according to directions substantially orthogonal to a plane defined by said base surfaces.

4. The device as claimed in claim 3, wherein said first side wall has a pair of end portions each facing a respective end portion of said second side wall.

5. The device as claimed in claim 4, wherein each region interposed between the end portions of the first side wall and the end portions of the second side wall defines a respective through window.

6. The device as claimed in claim 5, wherein each of said through windows extends from said separation region toward said top wall.

7. The device as claimed in claim 6, wherein:
    a distance between said base portions has a given value estimated on a plane defined by said base surfaces along a direction substantially perpendicular to a major extension direction of said separation region; and
    each of said through windows has a width estimated in a direction parallel to said distance between said base portions that is larger than such a distance.

8. The device as claimed in claim 3, wherein concavities of said first and second side walls are mutually faced to define said cavity.

9. The device as claimed in claim 1, wherein an inner surface of said housing portion defining said cavity has a shape deviating from a figure having cylindrical symmetry relative to any axis.

10. The device as claimed in claim 1, wherein said electronic unit has a shape deviating from a figure having cylindrical symmetry relative to any axis.

11. The device as claimed in claim 1, wherein said base portions, when said connecting member is in the retaining condition, define a substantially circular profile on a plane defined by said base surfaces.

12. The device as claimed in claim 11, wherein a diameter of said substantially circular profile lies in a major extension direction of said separation region.

13. The device as claimed in claim 1, wherein the retaining condition of said connecting member is a condition of elastic rest of the connecting member.

14. The device as claimed in claim 1, wherein said electronic unit comprises at least one sensor and an antenna.

15. The device as claimed in claim 1, wherein said electronic unit comprises at least one sensor and an antenna, and wherein the top wall of said connecting member has at least one through window through which said antenna can emit/receive electromagnetic signals.

16. The device as claimed in claim 14, wherein said sensor is a pressure and/or temperature sensor.

17. The device as claimed in claim 1, wherein said electronic unit comprises at least one sensor and an antenna, wherein said sensor is a pressure and/or temperature sensor, and wherein the top wall of said connecting member has a through window through which said pressure and/or temperature sensor can carry out pressure and/or temperature measurements.

18. The device as claimed in claim 17, further comprising a covering element positioned on said top wall and facing said through window at said pressure and/or temperature sensor.

19. A tyre for vehicle wheels comprising:
an inner surface having a substantially toroidal conformation; and
a monitoring device as claimed in claim 1, mounted on said inner surface, wherein said inner surface is a liner of said tyre.

20. The tyre as claimed in claim 19, wherein a major extension direction of said separation region substantially lies in a radial plane of said tyre.

21. A method for installing an electronic unit in a tyre, comprising:
providing an electronic unit;
providing a connecting member that is of one piece construction and comprises:
a first and a second base portions, mutually separated by a separation region, each of said base portions having a respective base surface associable with an inner surface of a tyre; and
a housing portion associated with said base portions, and in cooperation with said base portions defining a cavity for housing said electronic unit,
wherein said connecting member is deformable between an insertion condition of said electronic unit into said cavity and a retaining condition of said electronic unit in said cavity,
wherein, in said insertion condition, said connecting member is configured for enabling insertion of said electronic unit into said cavity when said base portions are not fastened to said inner surface of said tyre,
wherein, in said retaining condition, said connecting member is configured for preventing extraction of said electronic unit from said cavity under any direction when said base portions are fastened to said inner surface of said tyre;
configuring said connecting member in said insertion condition;
inserting said electronic unit into said cavity;
configuring said connecting member in said retaining condition; and
fastening said base surfaces to said inner surface of said tyre when said connecting member is in said retaining condition, and
wherein configuring said connecting member in the insertion condition comprises moving said base portions away from each other.

22. The method as claimed in claim 21, wherein inserting said electronic unit into said cavity comprises moving said electronic unit close to said housing portion through said base portions moved away from each other.

23. The method as claimed in claim 22, wherein said connecting member is configured in the retaining condition after insertion of said electronic unit into said cavity.

24. The method as claimed in claim 23, wherein the retaining condition of said connecting member is a condition of elastic rest.

25. The method as claimed in claim 24, wherein configuring said connecting member in said retaining condition comprises enabling elastic moving close to each other again of said moved apart base portions.

26. The method as claimed in claim 21, wherein said separation region has a major extension direction, said connecting member being fastened to said inner surface of the tyre in such a manner that said major extension direction substantially lies in a radial plane of said tyre.

* * * * *

UNITED STATES PATENT AND TRADEMARK OFFICE
CERTIFICATE OF CORRECTION

PATENT NO. : 8,984,936 B2  
APPLICATION NO. : 14/366164  
DATED : March 24, 2015  
INVENTOR(S) : Massimo Brusarosco et al.

Page 1 of 1

It is certified that error appears in the above-identified patent and that said Letters Patent is hereby corrected as shown below:

In the Claims

Claim 1, Column 11, Line 65, "tap" should read as --top--.

Signed and Sealed this
Twenty-ninth Day of September, 2015

Michelle K. Lee
*Director of the United States Patent and Trademark Office*